(12) United States Patent
Smith et al.

(10) Patent No.: US 10,024,369 B2
(45) Date of Patent: Jul. 17, 2018

(54) CLUTCH DISC WITH AXIALLY EXPANDED SPLINE TEETH

(71) Applicant: Schaeffler Technologies AG & CO. KG, Herzogenaurach (DE)

(72) Inventors: David Smith, Wadsworth, OH (US); Michael Hodge, Creston, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 26 days.

(21) Appl. No.: 15/262,401

(22) Filed: Sep. 12, 2016

(65) Prior Publication Data

US 2018/0073571 A1    Mar. 15, 2018

(51) Int. Cl.
  *F16D 13/64*   (2006.01)
  *F16D 13/52*   (2006.01)
  *F16D 13/75*   (2006.01)
  *F16D 13/38*   (2006.01)

(52) U.S. Cl.
  CPC ............. *F16D 13/75* (2013.01); *F16D 13/64* (2013.01); *F16D 13/38* (2013.01); *F16D 13/52* (2013.01); *F16D 13/648* (2013.01)

(58) Field of Classification Search
  None
  See application file for complete search history.

(56) References Cited

U.S. PATENT DOCUMENTS

| 2,738,864 | A | * | 3/1956 | Becker | F16D 13/52 |
| | | | | | 192/107 C |
| 4,058,027 | A | * | 11/1977 | Webb | B60K 17/3465 |
| | | | | | 180/233 |
| 4,940,124 | A | | 7/1990 | Galuska | |
| 8,939,270 | B2 | * | 1/2015 | Dziurda | F16D 13/52 |
| | | | | | 192/70.28 |
| 2001/0001768 | A1 | | 5/2001 | Kundermann | |
| 2002/0017435 | A1 | | 2/2002 | Feldmann et al. | |
| 2011/0067971 | A1 | * | 3/2011 | Ratner | F16D 13/648 |
| | | | | | 192/70.2 |
| 2013/0270054 | A1 | | 10/2013 | Dziurda | |

FOREIGN PATENT DOCUMENTS

JP     3-265718     * 11/1991

OTHER PUBLICATIONS

International Search Report and Opinion for PCT/US2017/050283; 9 pgs; dated Dec. 28, 2017 by Korean Intellectual Property Office.

* cited by examiner

*Primary Examiner* — Mark A Manley

(57) ABSTRACT

A clutch disc, including: an axis of rotation; an annular core ring; a first plurality of spline teeth forming a first radially outermost portion of the clutch disc; and a second plurality of spline teeth forming a second radially outermost portion of the clutch disc, respective spline teeth in the second plurality of spline teeth alternating, in a circumferential direction, with respective teeth in the first plurality of spline teeth. A circle passing through the first plurality of spline teeth does not pass through the second plurality of spline teeth.

18 Claims, 10 Drawing Sheets

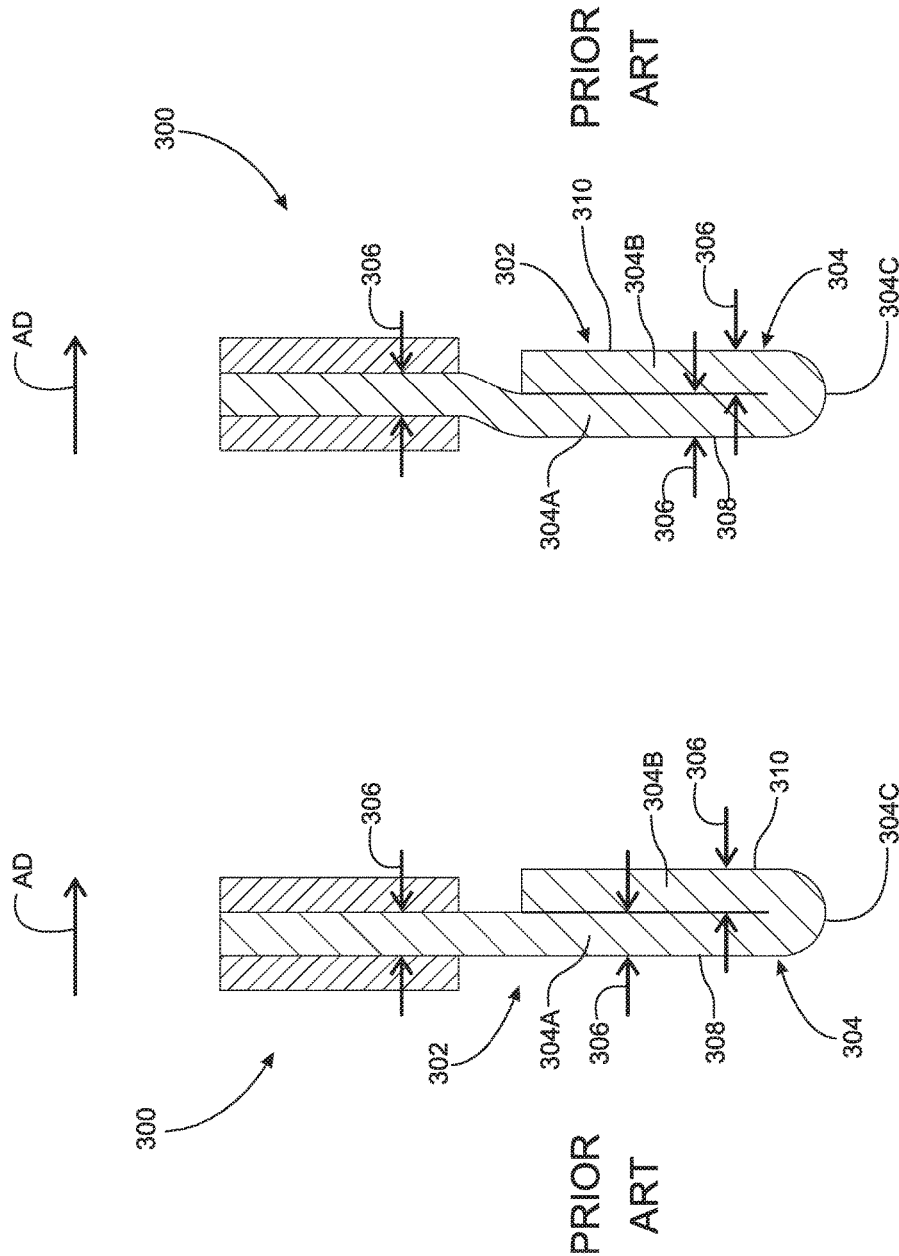

CLUTCH DISC WITH AXIALLY EXPANDED SPLINE TEETH

TECHNICAL FIELD

The present disclosure relates to a clutch disc having axially expanded spline teeth, in particular, spline teeth alternating in a circumferential direction and extending axially beyond a core ring for the clutch disc.

BACKGROUND

At high rotational speeds, known clutch discs can flutter or wobble from side to side, for example, due to turbulent fluid forces buffeting the clutch discs. As the clutch discs flutter, the clutch discs contact clutch pack separator discs, resulting in an undesirable increase in drag torque for a clutch including the clutch discs. Grooves have been added to known clutch discs to address the flutter or wobble problem. However, the grooves have not adequately resolved the flutter or wobble problem.

FIG. 9 is a partial cross-sectional view of known cast aluminum clutch disc 200. Cast aluminum clutch disc 200 includes spline teeth 202 wider than core ring 204 for clutch disc 200. However, cast aluminum clutch discs are more costly to fabricate than stamped steel clutch discs.

FIGS. 10A and 10B are respective cross-sectional views of known clutch discs 300. In FIGS. 10A and 10B, radially inner portions of core ring 302 have been folded over to form spline tooth 304. Thus, core ring 302 and portions 304A and 304B of tooth 304 have a same thickness 306. The 180 degree bend required to form portions 304A and 304B stresses tooth 304, in particular at rounded ends 304C, reducing the durability of tooth 304. In FIG. 10A, tooth 304 is axially asymmetrical with respect to ring 302, for example, all of portion 304A is radially aligned with ring 302 and portion 304B extends past ring 302 in axial direction AD. In FIG. 10B, portions 304A and 304B are axially centered (symmetrical) with respect to ring 302; however, thickness 306 has been reduced. Reducing thickness 306 reduces the durability of disc 300. Further, rounded ends 304C of teeth 304 reduce the area of sides 308 and 310 parallel to ring 302 and in contact with a hub or other clutch component in which disc 300 is installed. Reducing the area reduces the stability of disc 300 in a clutch and increases the likelihood of disc 300 fluttering or wobbling. Increasing the area of sides 308 and 310 in contact with the hub or other clutch component, by increasing the depth of a groove receiving tooth 304, increases the cost of fabricating the hub or other component and may compromise the durability of the hub or other clutch component.

SUMMARY

According to aspects illustrated herein, there is provided a clutch disc, including: an axis of rotation; an annular core ring; a first plurality of spline teeth forming a first radially outermost portion of the clutch disc; and a second plurality of spline teeth forming a second radially outermost portion of the clutch disc, respective spline teeth in the second plurality of spline teeth alternating, in a circumferential direction, with respective teeth in the first plurality of spline teeth. A circle passing through the first plurality of spline teeth does not pass through the second plurality of spline teeth.

According to aspects illustrated herein, there is provided a clutch disc, including: an axis of rotation; an annular core ring having first and second sides facing in first and second axial directions, respectively; a first plurality of spline teeth forming a first radially outermost portion of the clutch disc and including respective first sides located further than the first and second sides in the first axial direction; and a second plurality of spline teeth forming a second radially outermost portion of the clutch disc and including respective first sides located further than the first and second sides in the second axial direction. Respective spline teeth included in the first plurality of spline teeth alternate, in a circumferential direction, with respective spline teeth included in the second plurality of spline teeth.

According to aspects illustrated herein, there is provided a clutch disc, including: an axis of rotation; an annular core ring including first and second sides facing in first and second axial directions, respectively, and separated by a first distance in the first axial direction; a first spline tooth including a first side located past the first and second sides of the annular core ring in the first axial direction and a second side facing in the second axial direction; and a second spline tooth including a first side located past the first and second sides of the annular core ring in the second axial direction and a second side facing in the first axial direction. The second side of the first spline tooth and the second side of the second spline tooth are separated, in the first axial direction, by a second distance: equal to the first distance; or less than the first distance; or greater than the first distance.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
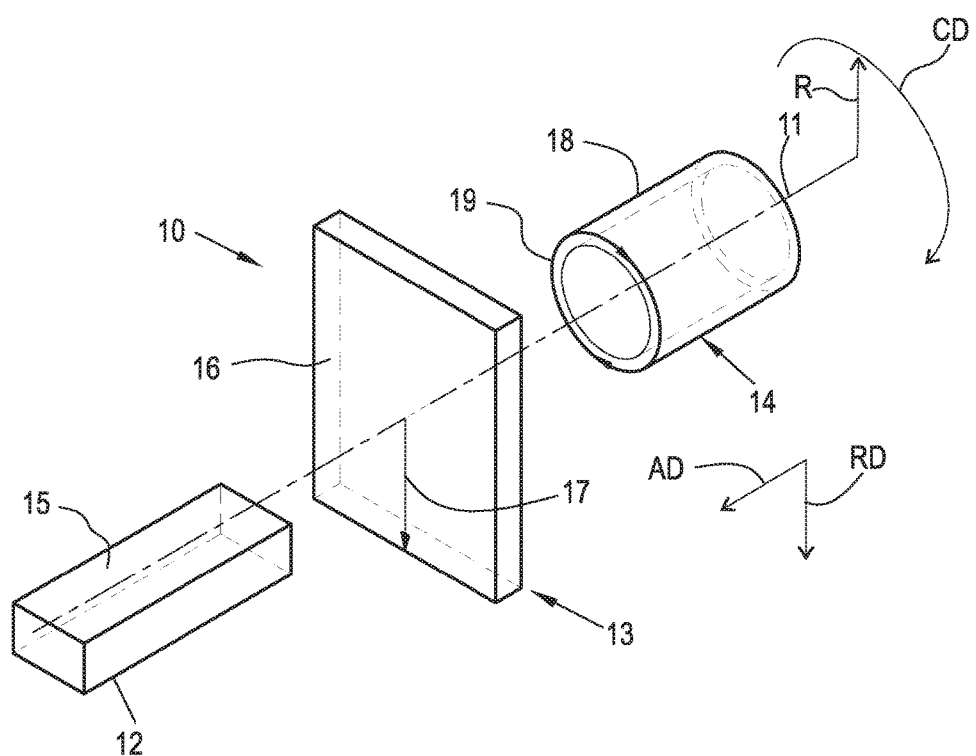
FIG. 1 is a perspective view of a cylindrical coordinate system demonstrating spatial terminology used in the present application.

FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane co-planar with axis 11. Axis 11 passes through planar surface 15; however any planar surface co-planar with axis 11 is an axial surface. A radial surface, such as surface 16 of object 13, is formed by a plane orthogonal to axis 11 and co-planar with a radius, for example, radius 17. Radius 17 passes through planar surface 16; however any planar surface co-planar with radius 17 is a radial surface. Surface 18 of object 14 forms a circumferential, or cylindrical, surface. For example, circumference 19 is passes through surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively. For example, an axially disposed surface or edge extends in direction AD, a radially disposed surface or edge extends in direction R, and a circumferentially disposed surface or edge extends in direction CD.

Figure 2:
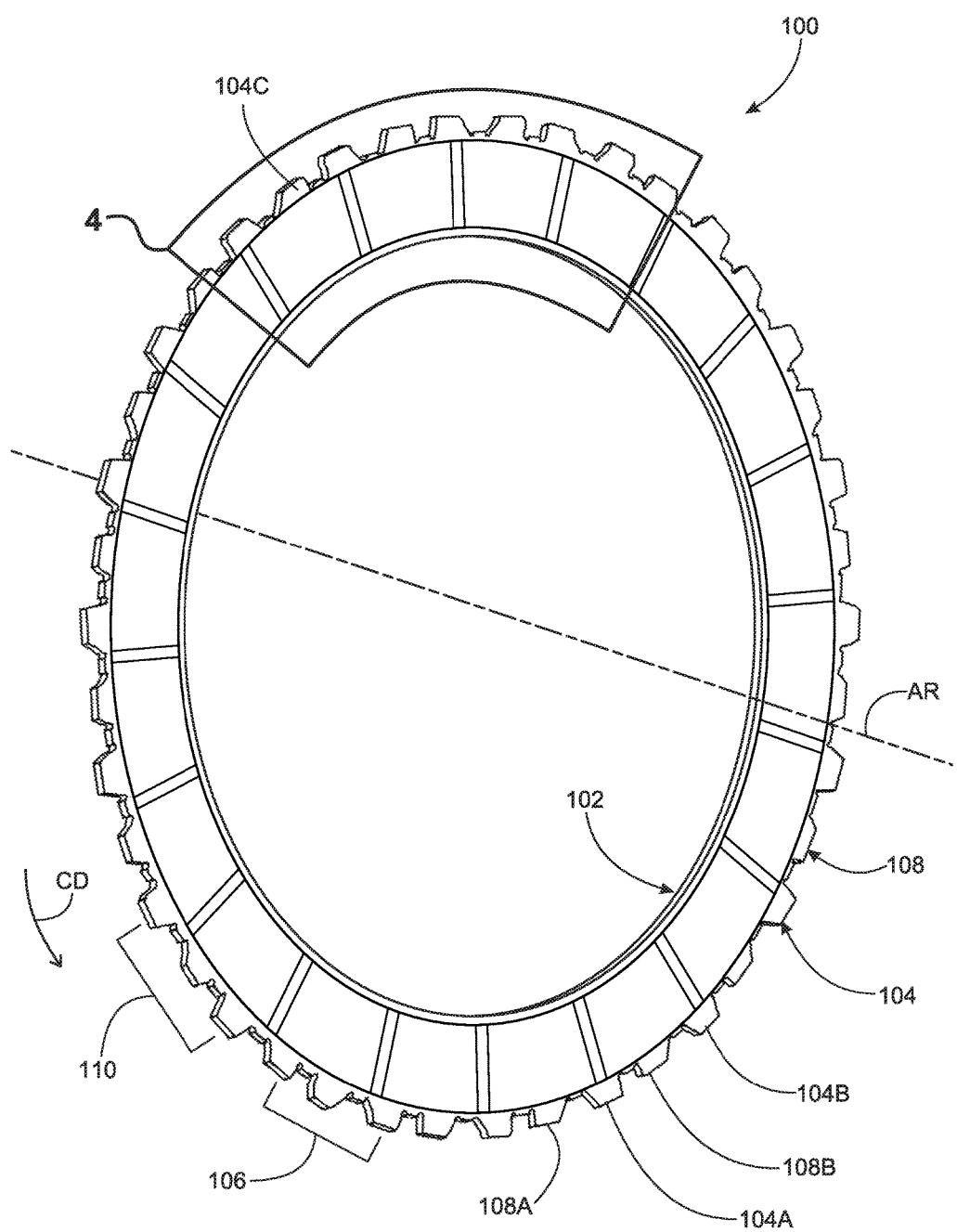
FIG. 2 is a front perspective view of a clutch disc with axially expanded spline teeth.

FIG. 2 is a front perspective view of clutch disc 100 with axially expanded spline teeth.

Figure 3:
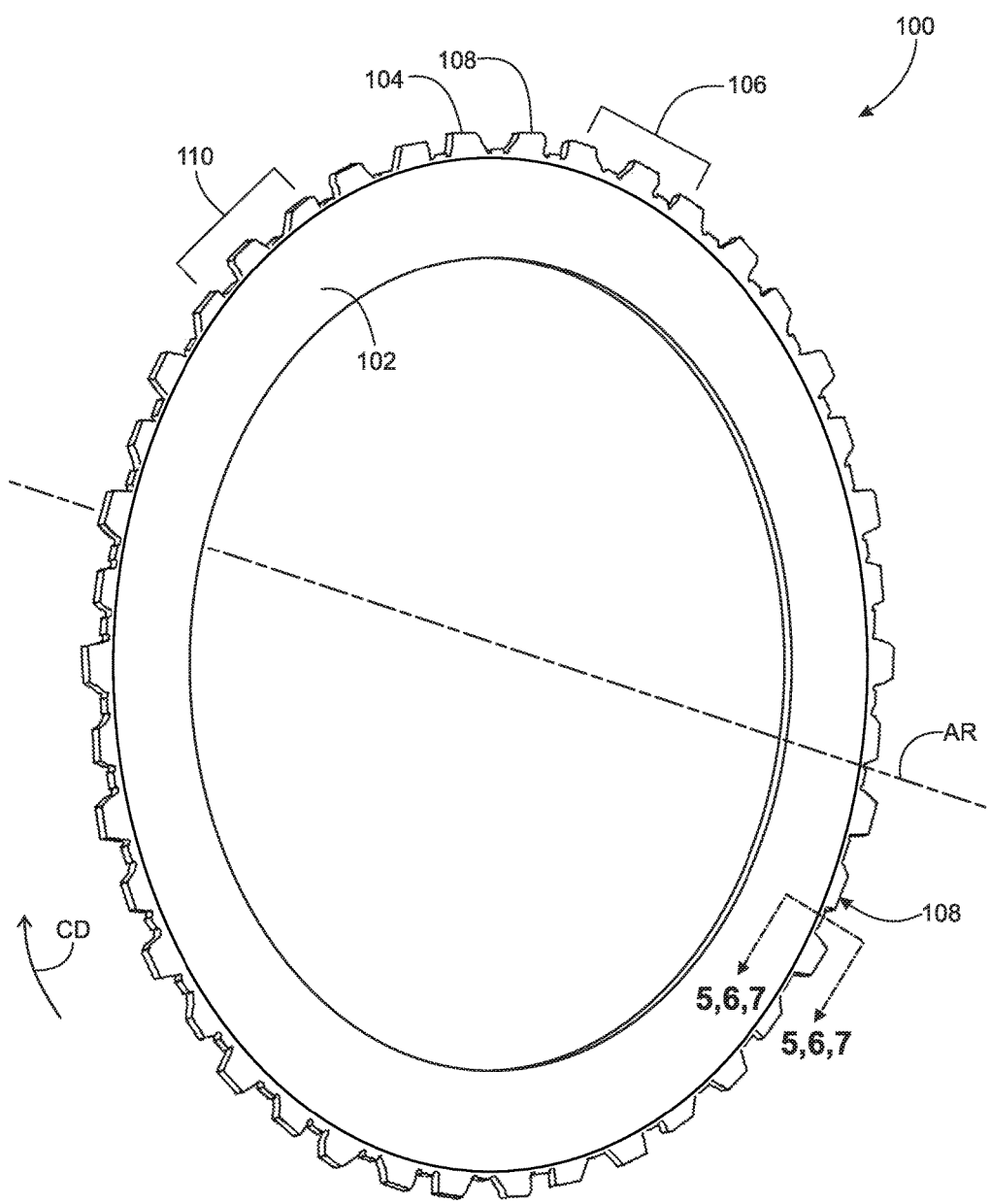
FIG. 3 is a back perspective view of the clutch disc of FIG. 2.

FIG. 3 is a back perspective view of clutch disc 100 of FIG. 2. The following should be viewed in light of FIGS. 2 and 3. Clutch disc 100 includes axis of rotation AR, annular core ring 102, spline teeth 104 forming radially outermost portion 106 of clutch disc 100, and spline teeth 108 forming radially outermost portion 110 of clutch disc 100. To simplify the visual representation of clutch 100, only respective parts of portions 106 and 110 are labeled in FIG. 3. Respective teeth 104 alternate, in circumferential direction CD, with respective teeth 108. For example, teeth 104A and 104B alternate with teeth 108A and 108B in direction CD.

Figure 4:
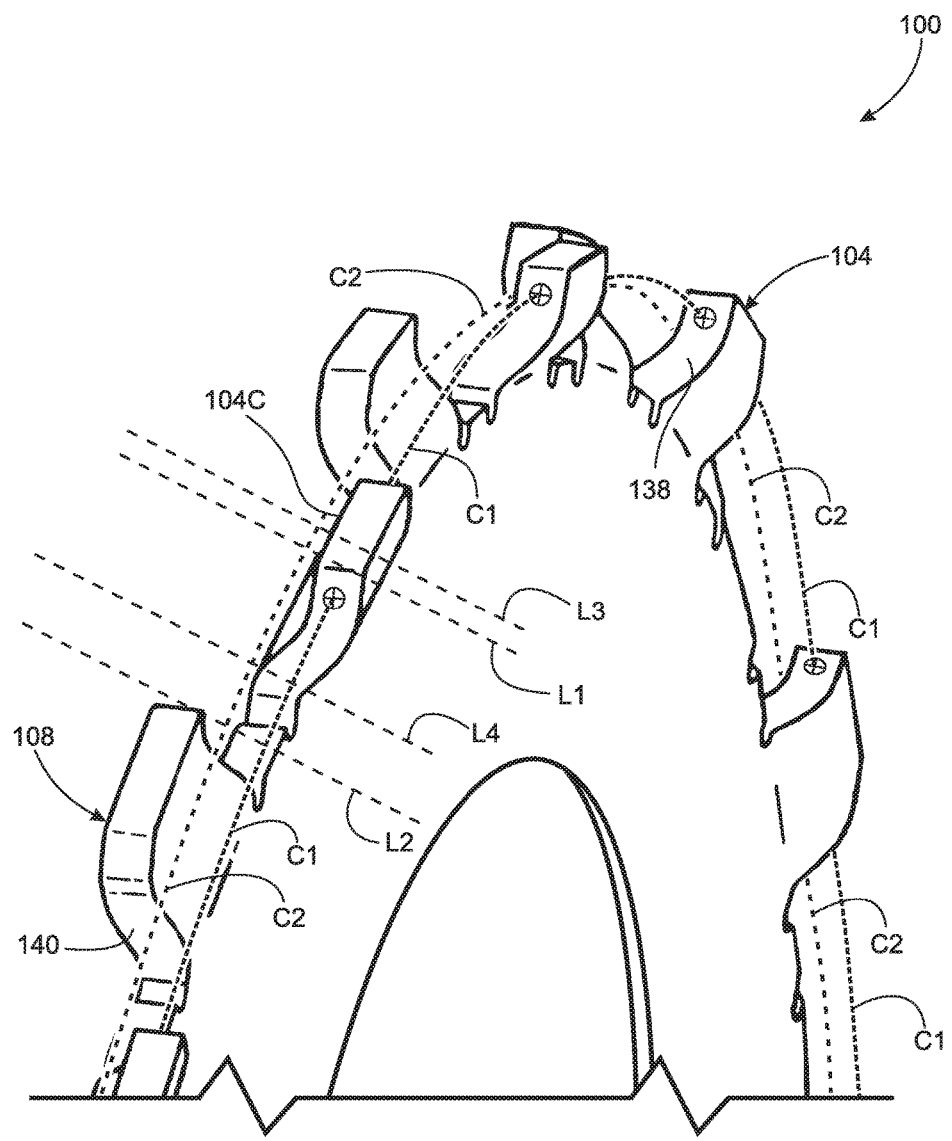
FIG. 4 is a detail of area 4 in FIG. 2 with friction facing removed.

FIG. 4 is a detail of area 4 of FIG. 2 with friction facing removed.

Figure 5:
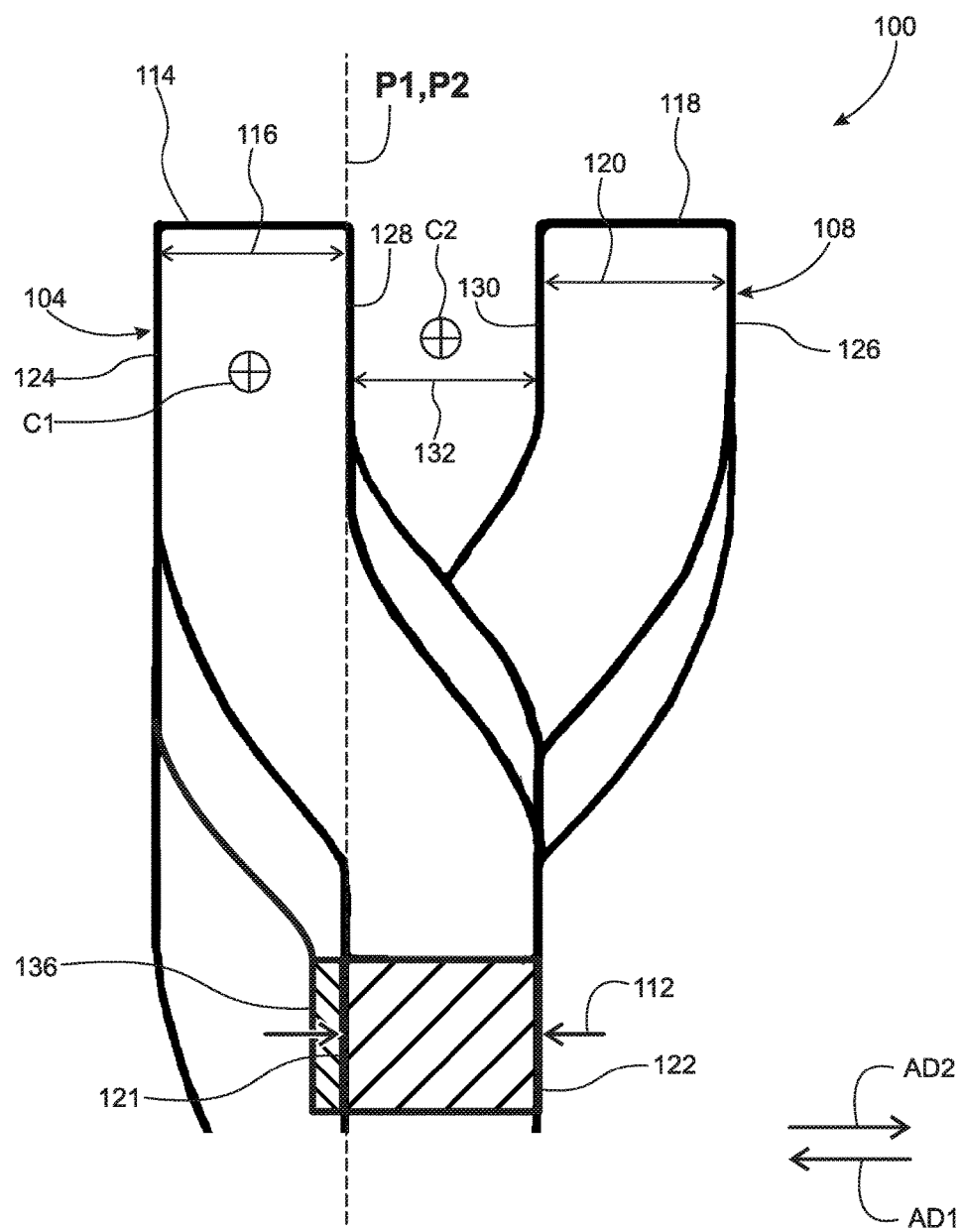
FIG. 5 is a cross-sectional view, generally along line 5,6,7-5,6,7 in FIG. 3, showing spline teeth axially separated by a distance equal to a thickness of an annular core ring for the clutch disc.

FIG. 5 is a cross-sectional view, generally along line 5,6,7-5,6,7 in FIG. 3, showing spline teeth axially separated by a distance equal to a thickness of an annular core ring for clutch disc 100. The following should be viewed in light of FIGS. 2 through 5. Circle C1, centered on axis AR and in a plane orthogonal to the axis of rotation AR, passes through spline teeth 104 without passing through spline teeth 108. Line L1, parallel to axis of rotation AR, passes through circle C1 and a tooth, for example tooth 104C, included in spline teeth 104 without passing through any tooth included in spline teeth 108. Line L2, parallel to axis of rotation AR passes through circle C1 without passing through any spline tooth included in spline teeth 104 or spline teeth 108. Spline teeth 104 are free of contact with spline teeth 108.

Circle C2, centered on axis AR and in a plane orthogonal to the axis of rotation AR, passes axially between spline teeth 104 and spline teeth 108, without passing through spline teeth 104 or spline teeth 108. Line L3, parallel to axis of rotation AR, passes through circle C2 and a tooth, for example tooth 104C, included in spline teeth 104 without passing through any tooth included in spline teeth 108. Line L4, parallel to axis of rotation AR passes through circle C2 without passing through any spline tooth included in spline teeth 104 or spline teeth 108.

Annular core ring 102 has thickness 112 in axial direction AD1. Each spline tooth spline tooth 104 includes radially outermost end 114 with dimension 116, in axial direction AD1. Each spline tooth spline tooth 108 includes radially outermost end 118 with dimension 120, in axial direction AD1. In an example embodiment, dimensions 116 and 120 are each equal to thickness 112. In an example embodiment, dimensions 116 and 120 are each no greater than thickness 112.

Annular core ring 102 includes side 121 facing in axial direction AD1 and side 122 facing in axial direction AD2, opposite direction AD1. Each spline tooth 104 includes side 124 located further than sides 121 and 122 in axial direction AD1. Each spline tooth 108 includes side 126 located further than sides 121 and 122 in axial direction AD2. Each spline tooth 104 includes side 128 facing axial direction AD2. Each spline tooth 108 includes side 130 facing axial direction AD1. Plane P1, orthogonal to axis of rotation AR passes through side 121. Plane P2, orthogonal to axis of rotation AR passes through sides 128. In an example embodiment, planes P1 and P2 are co-linear. In the example embodiment of FIG. 5, sides 128 and 130 are separated, in axial direction AD1, by distance 132 equal to thickness 112.

Figure 6:
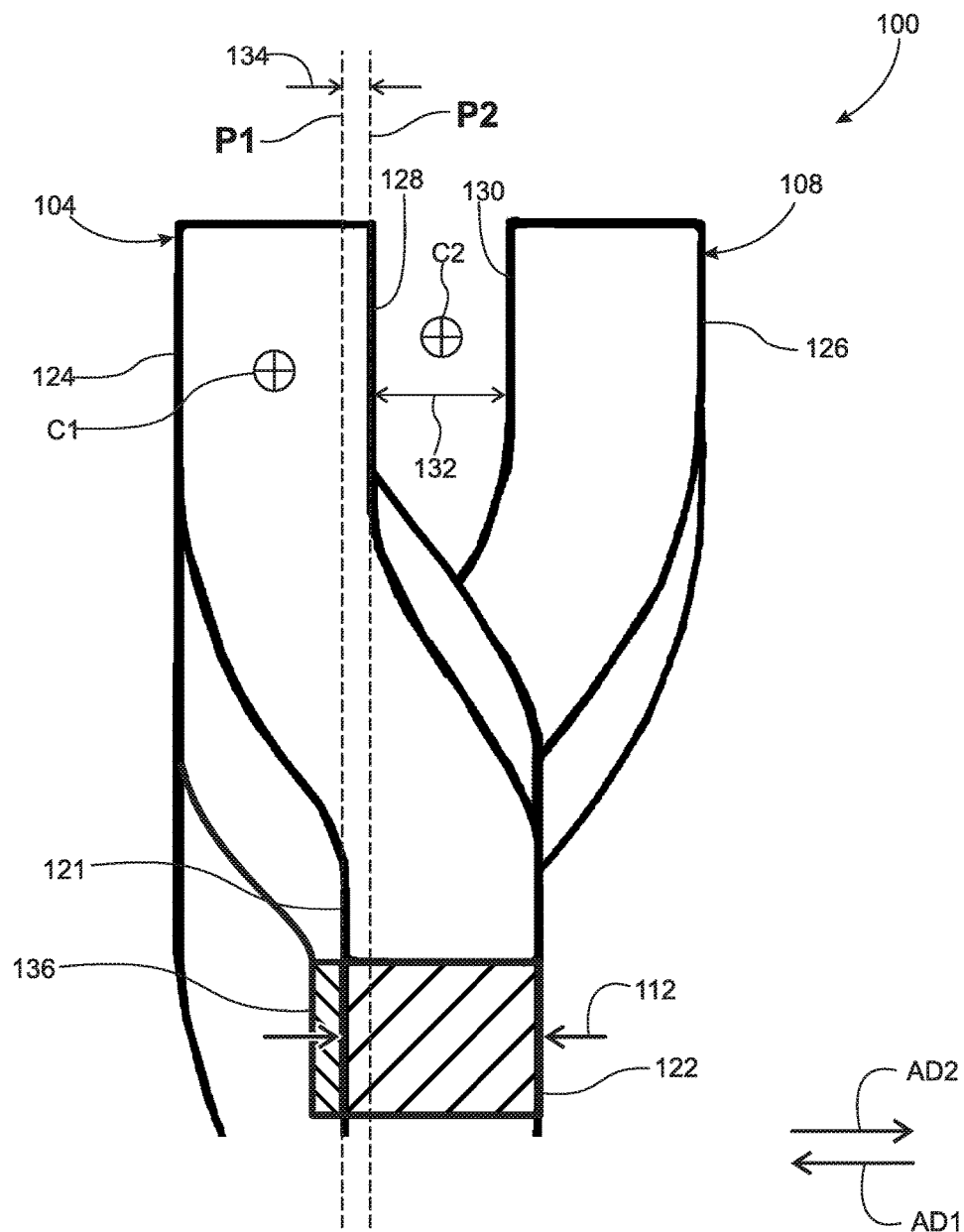
FIG. 6 is a cross-sectional view, generally along line 5,6,7-5,6,7 in FIG. 3, showing spline teeth axially separated by a distance less than a thickness of the annular core ring for the clutch disc.

FIG. 6 is a cross-sectional view, generally along line 5,6,7-5,6,7 in FIG. 3, showing spline teeth axially separated by a distance less than a thickness of the annular core ring for clutch disc 100. The discussion for clutch disc 100 in FIGS. 2 through 5 is applicable to clutch disc 100 in FIG. 6, except as follows. In the example of FIG. 6, planes P1 and P2 are separated by distance 134 in axial direction AD1, that is, planes P1 and P2 are not co-planar and plane P2 is past plane P1 in direction AD2. In the example embodiment of FIG. 6, sides 128 and 130 are separated, in axial direction AD, by distance 132 less than thickness 112.

Figure 7:
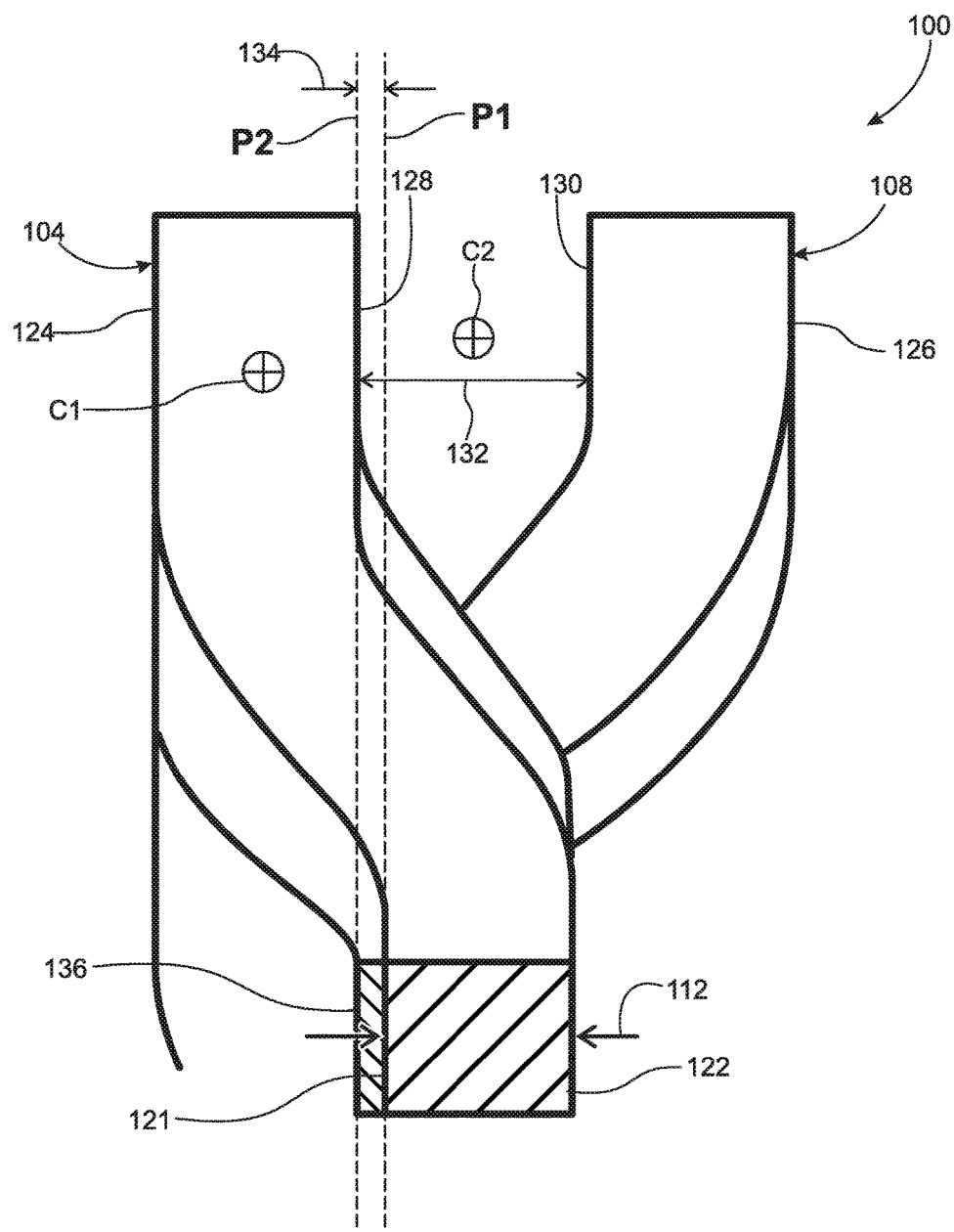
FIG. 7 is a cross-sectional view, generally along line 5,6,7-5,6,7 in FIG. 3, showing spline teeth axially separated by a distance greater than a thickness of the annular core ring for the clutch disc.

FIG. 7 is a cross-sectional view, generally along line 5,6,7-5,6,7 in FIG. 3, showing spline teeth axially separated by a distance greater than a thickness of the annular core ring for clutch disc 100. The discussion for clutch disc 100 in FIGS. 2 through 5 is applicable to clutch disc 100 in FIG. 7, except as follows. In the example of FIG. 7, planes P1 and P2 are separated by distance 134 in axial direction AD1, that is, planes P1 and P2 are not co-planar and plane P1 is past plane P2 in direction AD2. In the example embodiment of FIG. 7, sides 128 and 130 are separated, in axial direction AD1, by distance 132 greater than thickness 112.

The following provides further detail regarding clutch disc 100. In an example embodiment, sides 124 and 126 are orthogonal to axis of rotation AR, that is sides 124 and 126 are parallel to sides 121 and 122, respectively. The orientation of sides 124 and 126, and the circumferential interleaving of spline teeth 104 and 108 enable teeth 104 and 108 to be fabricated using standard stamping processes.

Figure 8:
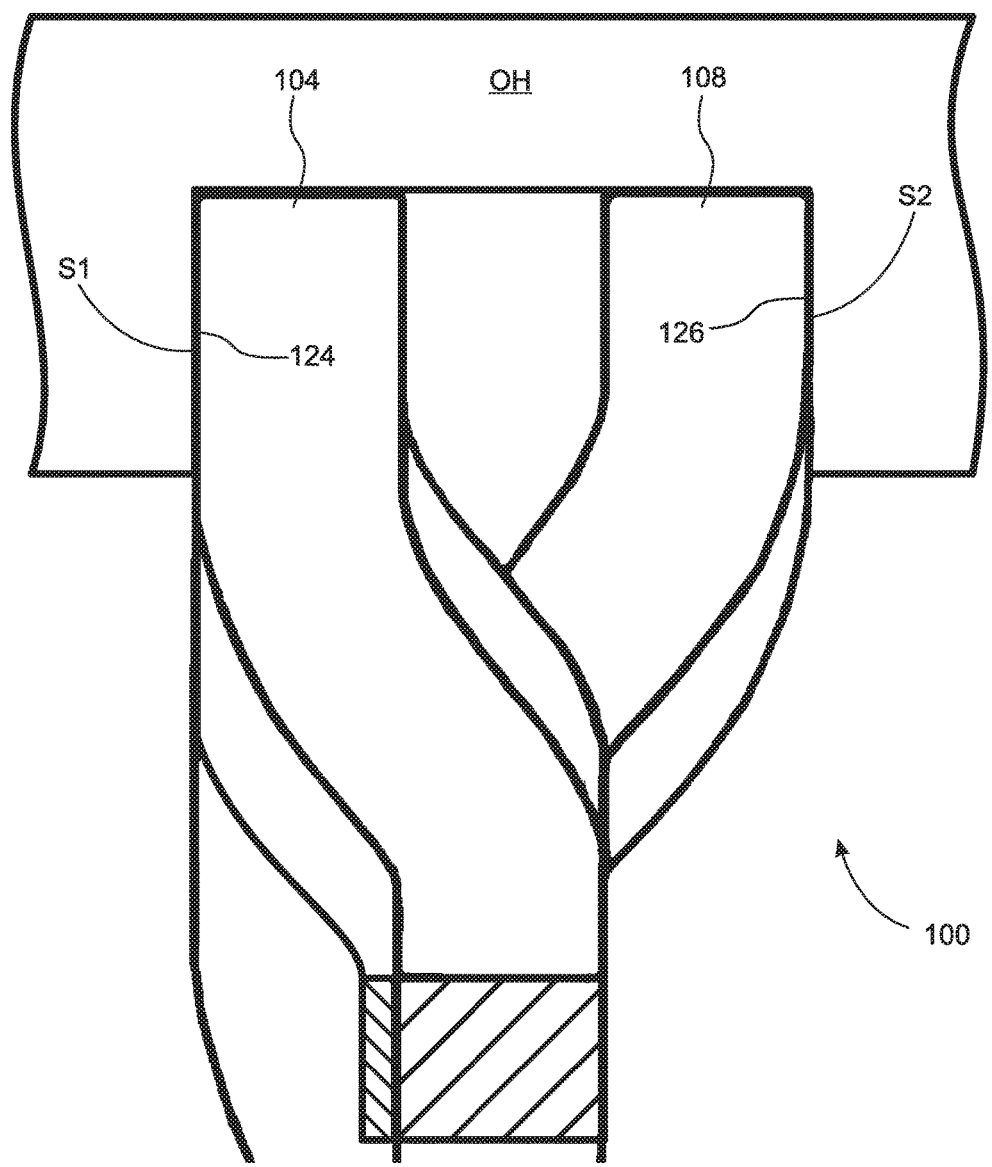
FIG. 8 is the view of FIG. 5 with a portion of an output hub included.
Figure 9:
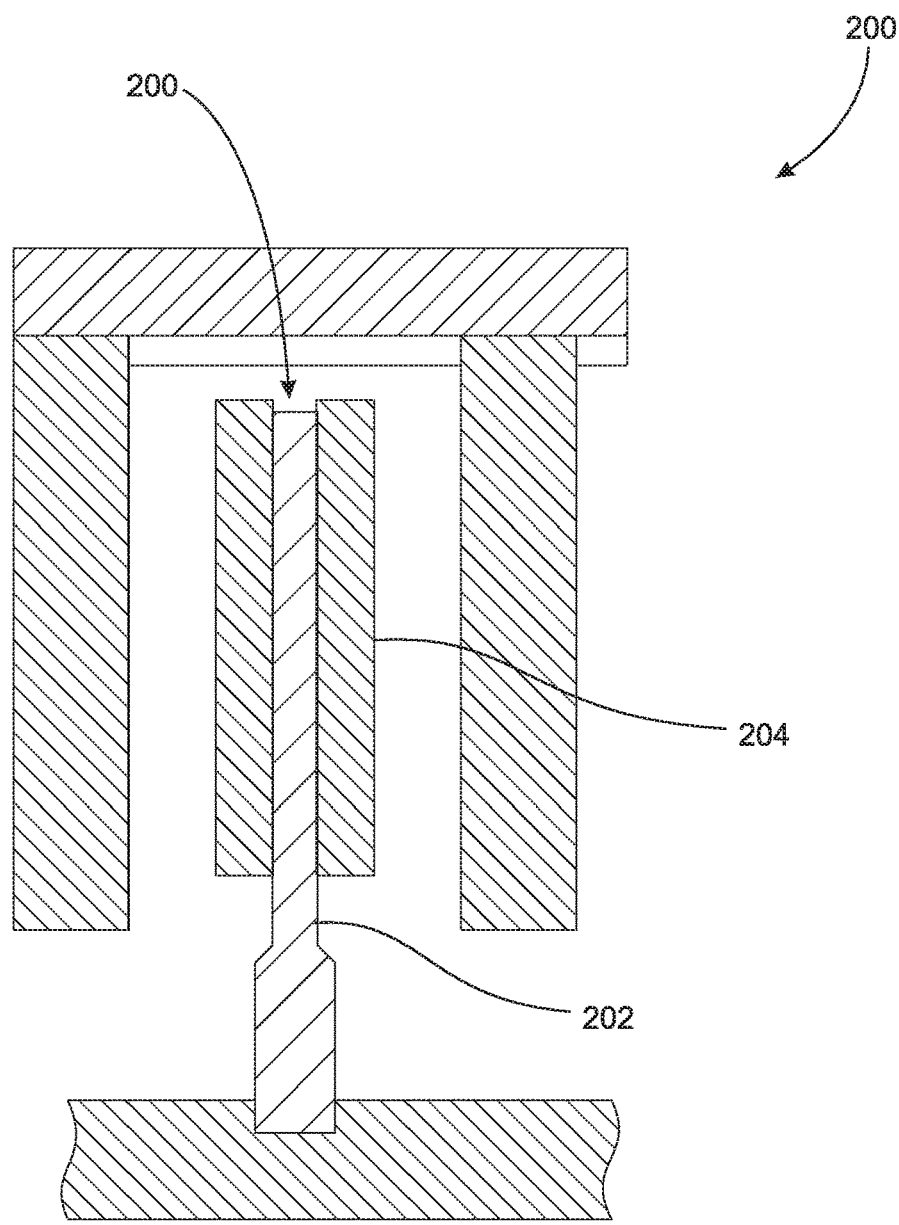
FIG. 9 is a partial cross-sectional view of a known art cast aluminum clutch disc; and, FIGS. 10A and 10B are respective cross-sectional views of known clutch discs.

FIG. 8 is FIG. 5 with a portion of output hub OH included. The following should be viewed in light of FIGS. 2 through 5. However, it should be understood that the discussion for FIG. 8 is applicable to FIGS. 6 and 7 as well. Advantageously, the parallel configuration of ring 102 and teeth 104 and 108 enables maximum mating contact between sides 124 and 126 and sides S1 and S2 of groove G in hub OH. Increasing the mating contact increases the stability of disc 100 in hub OH, reducing any tendency of disc 100 to tip, flutter or wobble.

In FIG. 2, friction facing 136 is fixed to side 121. Any friction facing known in the art can be used for facing 136. In an example embodiment (not shown), friction facing is fixed to side 122. As noted above, disc 100 can be fabricated using metal stamping processes. In an example embodiment, such processes result in curved segments 138 and 140 for teeth 104 and teeth 108, respectively, connecting ring 102 with teeth 104 and 108, respectively.

Advantageously, the axially expanded configuration of teeth 104 and 108, that is expanding teeth 104 and 108 to extend past ring 102 in directions AD1 and AD2, respectively, creates a wider and more stable base for clutch disc 100 when disc 100 is installed in hub OH. The wider more stable base increases the stability of disc 100 in hub OH, reducing any tendency of disc 100 to tip, flutter or wobble. Further, the circumferential interleaving of teeth 104 and 108 enables nesting of adjacent discs 100, reducing the axial space required for a clutch having multiple discs 100.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS

AD1 axial direction
AR axis of rotation
C1 circle
C2 circle
CD circumferential direction
G groove
L1 axial line
L2 axial line
L3 axial line
L4 axial line
OH output hub
P1 radial plane
P2 radial plane
S1 side of groove G
S2 side of groove G
100 clutch disk
102 core ring
104 spline teeth
104A spline tooth
104B spline tooth
104C spline tooth
106 radially outermost portion of clutch disc 100
108 spline teeth
108A spline tooth
108B spline tooth
110 radially outermost portion of clutch disc 100
112 thickness of core ring 102
114 radially outermost end of teeth 104
116 axial dimension of end 114
118 radially outermost end of teeth 108
120 axial dimension of end 118
121 side of core ring 102
122 side of core ring 102
124 side of teeth 104
126 side of teeth 108
128 side of teeth 104
130 side of teeth 108
132 axial distance
134 axial distance
136 friction facing
138 curved segment for teeth 104
140 curved segment for teeth 108

The invention claimed is:
1. A clutch disc, comprising:
an axis of rotation;
an annular core ring;
a first plurality of spline teeth forming a first radially outermost portion of the clutch disc; and,
a second plurality of spline teeth forming a second radially outermost portion of the clutch disc, respective spline teeth in the second plurality of spline teeth alternating, in a circumferential direction, with respective teeth in the first plurality of spline teeth, wherein:
a circle, in a plane orthogonal to the axis of rotation, passes between the first plurality of spline teeth and the second plurality of spline teeth without passing through the first plurality of spline teeth or the second plurality of spline teeth;
a spline tooth in the first plurality of spline teeth includes a first side orthogonal to the axis of rotation and facing in a first axial direction;
a spline tooth in the second plurality of spline teeth includes a first side orthogonal to the axis of rotation and facing in a second axial direction, opposite the first axial direction; and,
every spline tooth of the clutch disc is included in the first plurality of spline teeth or in the second plurality of spline teeth.
2. The clutch disc of claim 1, wherein a line parallel to the axis of rotation passes through the circle and the spline tooth in the first plurality of spline teeth without passing through any spline tooth in the second plurality of spline teeth.
3. The clutch disc of claim 1, wherein a line parallel to the axis of rotation passes through the circle without passing through any spline tooth in the first or second plurality of spline teeth.
4. The clutch disc of claim 1, wherein the first plurality of spline teeth is free of contact with the second plurality of spline teeth.
5. The clutch disc of claim 1, wherein:
the annular core ring has a thickness in the first axial direction;
each spline tooth in the first plurality of spline teeth includes a radially outermost end with a dimension, in the first axial direction, equal to the thickness of the annular core ring; and,
each spline tooth in the second plurality of spline teeth includes a radially outermost end with a dimension, in the first axial direction, equal to the thickness of the annular core ring.

6. The clutch disc of claim 1, wherein:
the annular core ring has a first side and a second side facing in the first and second axial directions, respectively;
the first side of the spline tooth in the first plurality of spline teeth is located further than the first and second sides of the annular core ring in the first axial direction; and,
the first side of the spline tooth in the second plurality of spline teeth is located further than the first and second sides of the annular core ring in the second axial direction.

7. The clutch disc of claim 6, wherein:
the spline tooth in the first plurality of spline teeth includes a second side facing in the second axial direction;
a first plane, orthogonal to the axis of rotation, passes through the first side of the annular core ring;
a second plane, orthogonal to the axis of rotation, passes through the second side of the spline tooth in the first plurality of spline teeth; and,
the first and second planes are co-planar; or,
the first and second planes are separated by a distance in the first axial direction.

8. The clutch disc of claim 6, wherein:
the spline tooth in the first plurality of spline teeth includes a second side facing in the second axial direction;
the spline tooth in the second plurality of spline teeth includes a second side facing in the first axial direction; and,
the second side of the spline tooth in the first plurality of spline teeth and the second side of the spline tooth in the second plurality of spline teeth are separated, in the first axial direction, by a distance.

9. The clutch disc of claim 8, wherein:
the annular core ring has a thickness, in the first axial direction; and,
the distance is:
equal to the thickness of the annular core ring; or,
less than the thickness of the annular core ring and greater than zero.

10. The clutch disc of claim 1, wherein the respective spline teeth in the first plurality of spline teeth are separated, in a circumferential direction, from the respective spline teeth in the second plurality of spline teeth.

11. A clutch disc, comprising:
an axis of rotation;
an annular core ring having a first side and a second side facing in first and second axial directions, respectively;
a first plurality of spline teeth:
 forming a first radially outermost portion of the clutch disc; and,
 including:
  respective first sides orthogonal to the axis of rotation, facing in a first axial direction, and located further than the first and second sides of the annular core ring in the first axial direction; and,
a second plurality of spline teeth:
 forming a second radially outermost portion of the clutch disc; and,
 including respective first sides orthogonal to the axis of rotation, facing in the second axial direction, and located further than the first and second sides of the annular core ring in the second axial direction, wherein:
  respective spline teeth included in the first plurality of spline teeth alternate, in a circumferential direction, with respective spline teeth included in the second plurality of spline teeth;
 the annular core ring has a thickness in the first axial direction;
 a spline tooth in the first plurality of spline teeth includes a second side orthogonal to the axis of rotation and facing in the second axial direction;
 a spline tooth in the second plurality of spline teeth includes a second side orthogonal to the axis of rotation and facing in the first axial direction;
 no spline tooth, forming any radially outermost portion of the clutch disc, is circumferentially located between the spline tooth of the first plurality of spline teeth and the spline tooth of the second plurality of spline teeth;
 the second side of the spline tooth in the first plurality of spline teeth and the second side of the spline tooth in the second plurality of spline teeth are separated, in the first axial direction, by a distance; and,
 the distance is:
  equal to the thickness; or,
  less than the thickness and greater than zero.

12. The clutch disc of claim 11, wherein a circle, in a plane orthogonal to the axis of rotation, passing through the first plurality of spline teeth does not pass through the second plurality of spline teeth.

13. The clutch disc of claim 11, wherein:
a circle passes axially between the first and second pluralities of spline teeth without passing through the first and second pluralities of spline teeth;
a first line, in the first axial direction, passes through the circle without passing through the first plurality of spline teeth or the second plurality of spline teeth; and,
a second line, in the first axial direction, passes through the first plurality of spline teeth and the circle.

14. The clutch disc of claim 11, wherein the first plurality of spline teeth is free of contact with the second plurality of spline teeth.

15. The clutch disc of claim 11, wherein:
the annular core ring has a thickness in the first axial direction; and,
each spline tooth in the first plurality of spline teeth includes a radially outermost end with a dimension, in the first axial direction, equal to the thickness of the annular core ring.

16. The clutch disc of claim 11, wherein:
a first plane, orthogonal to the axis of rotation, passes through the first side of the annular core ring;
a second plane, orthogonal to the axis of rotation, passes through the second side of the spline tooth in the first plurality of spline teeth; and,
the first and second planes are co-planar; or,
the first and second planes are separated by a distance in the first axial direction.

17. A clutch disc, comprising: an axis of rotation; an annular core ring including a first side and a second side facing in first and second axial directions, respectively, and separated by a first distance in the first axial direction; a first spline tooth including: a first side orthogonal to the axis of rotation and located past the first and second sides of the annular core ring in the first axial direction; and, a second side orthogonal to the axis of rotation and facing in the second axial direction; and, a second spline tooth including: a first side orthogonal to the axis of rotation and located past the first and second sides of the annular core ring in the second axial direction; and, a second side orthogonal to the axis of rotation and facing in the first axial direction, wherein: no spline tooth is circumferentially located between the first spline tooth and the second spline tooth; and, the second side of the first spline tooth and the second side of the second spline tooth are separated, in the first axial direction, by a second distance: equal to the first distance; or, greater than the first distance, wherein: the annular core ring has a thickness in the first axial direction; the first spline tooth includes a radially outermost end with a dimension, in the first axial direction, no greater than the thickness of the annular core ring; and, the second spline tooth includes a radially outermost end with a dimension, in the first axial direction, no greater than the thickness of the annular core ring.

18. The clutch disc of claim 17, wherein the first and second spline teeth are adjacent in a circumferential direction.

\* \* \* \* \*